United States Patent
Murakami

(10) Patent No.: US 6,359,650 B1
(45) Date of Patent: *Mar. 19, 2002

(54) ELECTRONIC CAMERA HAVING A TILT DETECTION FUNCTION

(75) Inventor: Taro Murakami, Musashino (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/577,345

(22) Filed: Dec. 22, 1995

(30) Foreign Application Priority Data

Dec. 28, 1994 (JP) .............................................. 6-328496

(51) Int. Cl.$^7$ ......................... H04N 5/222; H04N 5/232
(52) U.S. Cl. .................................. 348/333.04; 348/346
(58) Field of Search .......................... 396/50, 296, 281, 396/287, 82; 348/207, 208, 231, 239, 345, 346, 349, 350, 352, 333, 334, 341; H04N 5/225

(56) References Cited

U.S. PATENT DOCUMENTS

| | | | | |
|---|---|---|---|---|
| 4,794,459 A | * | 12/1988 | Moberg et al. | 348/346 |
| 5,128,768 A | * | 7/1992 | Suda et al. | 348/350 |
| 5,218,395 A | * | 6/1993 | Taniguchi et al. | 348/350 |
| 5,432,331 A | * | 7/1995 | Wertheimer | 348/349 |
| 5,499,074 A | * | 3/1996 | Ohsawa et al. | 396/50 |
| 5,512,951 A | * | 4/1996 | Torii | 348/353 |
| 5,625,848 A | * | 4/1997 | Imanari | 396/50 |
| 5,724,619 A | * | 3/1998 | Hamada et al. | 396/82 |

* cited by examiner

*Primary Examiner*—Tuan Ho
(74) *Attorney, Agent, or Firm*—Fitzpatrick, Cella, Harper & Scinto

(57) ABSTRACT

An electronic camera having a lens, an image pickup element for converting an object image formed on an image pickup surface into an electrical signal, a focus detection means for dividing the object image formed on the image pickup surface into a plurality of areas, and performing focus detection on the respective areas, a drive circuit for adjusting the lens on the basis of an output from the focus detection means, and a display circuit for displaying simultaneously focus detection information of the plurality of areas of the focus detection circuit on its display screen.

25 Claims, 9 Drawing Sheets

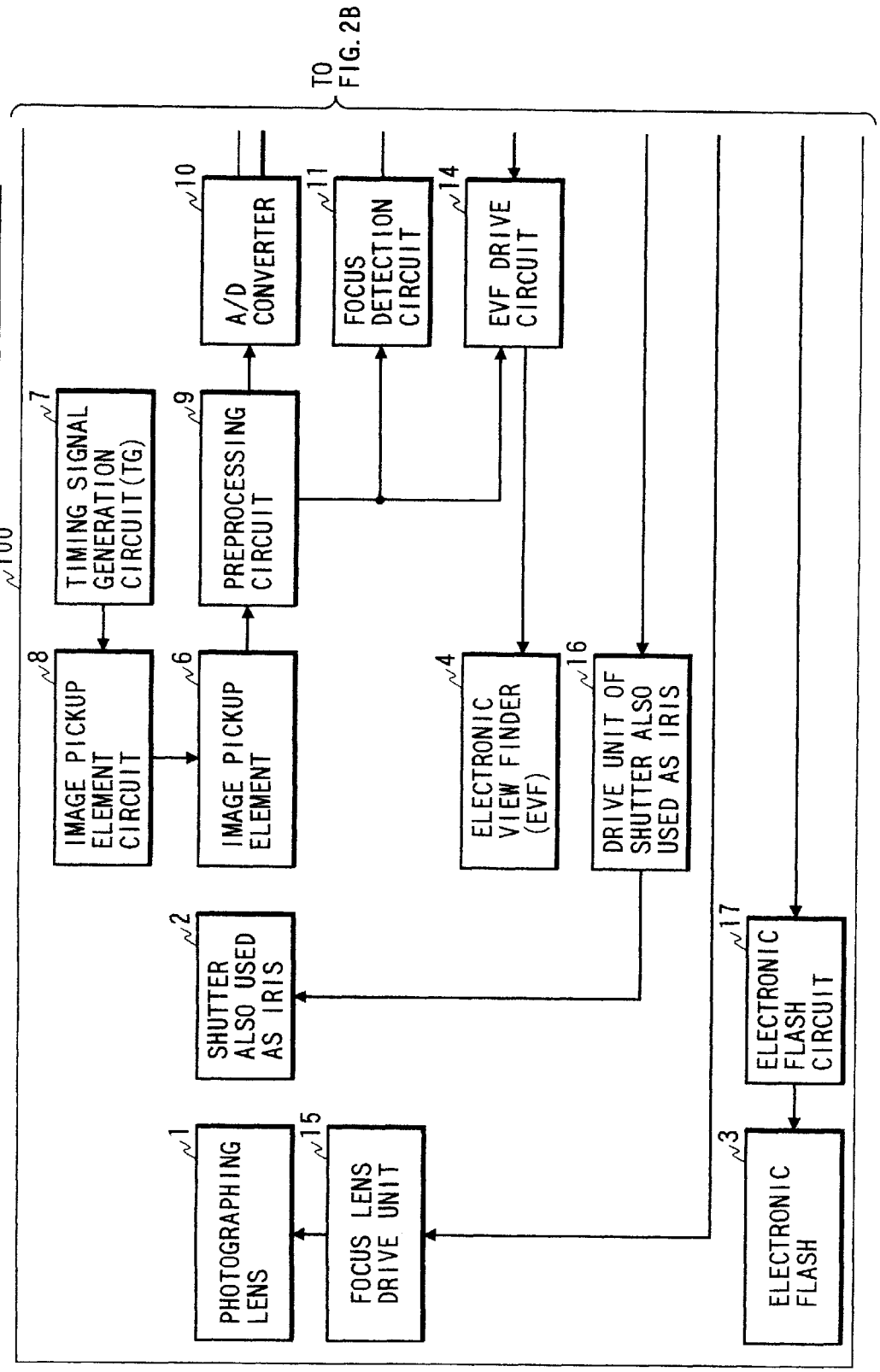

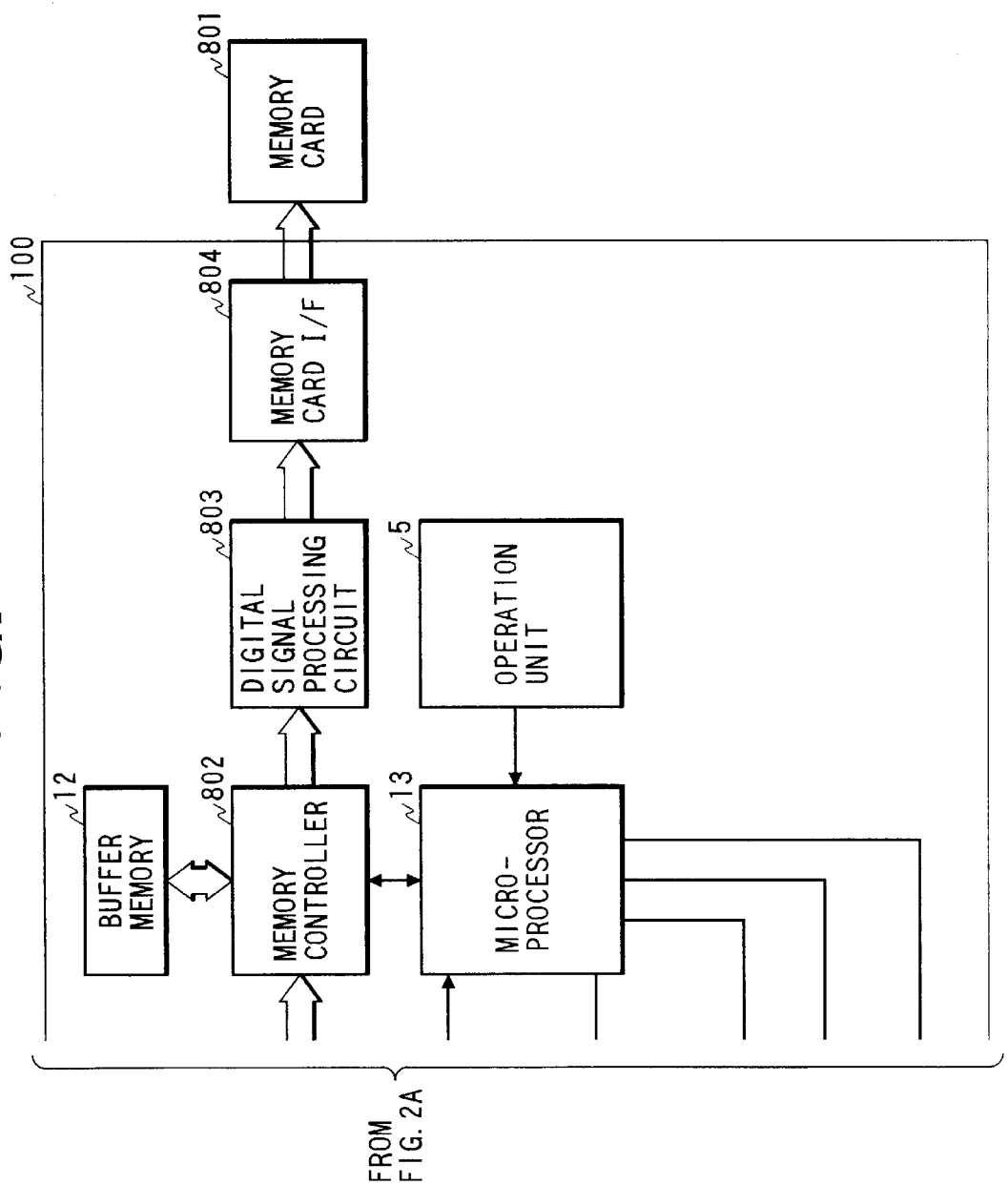

FRONT FOCUS ← IN-FOCUS → REAR FOCUS

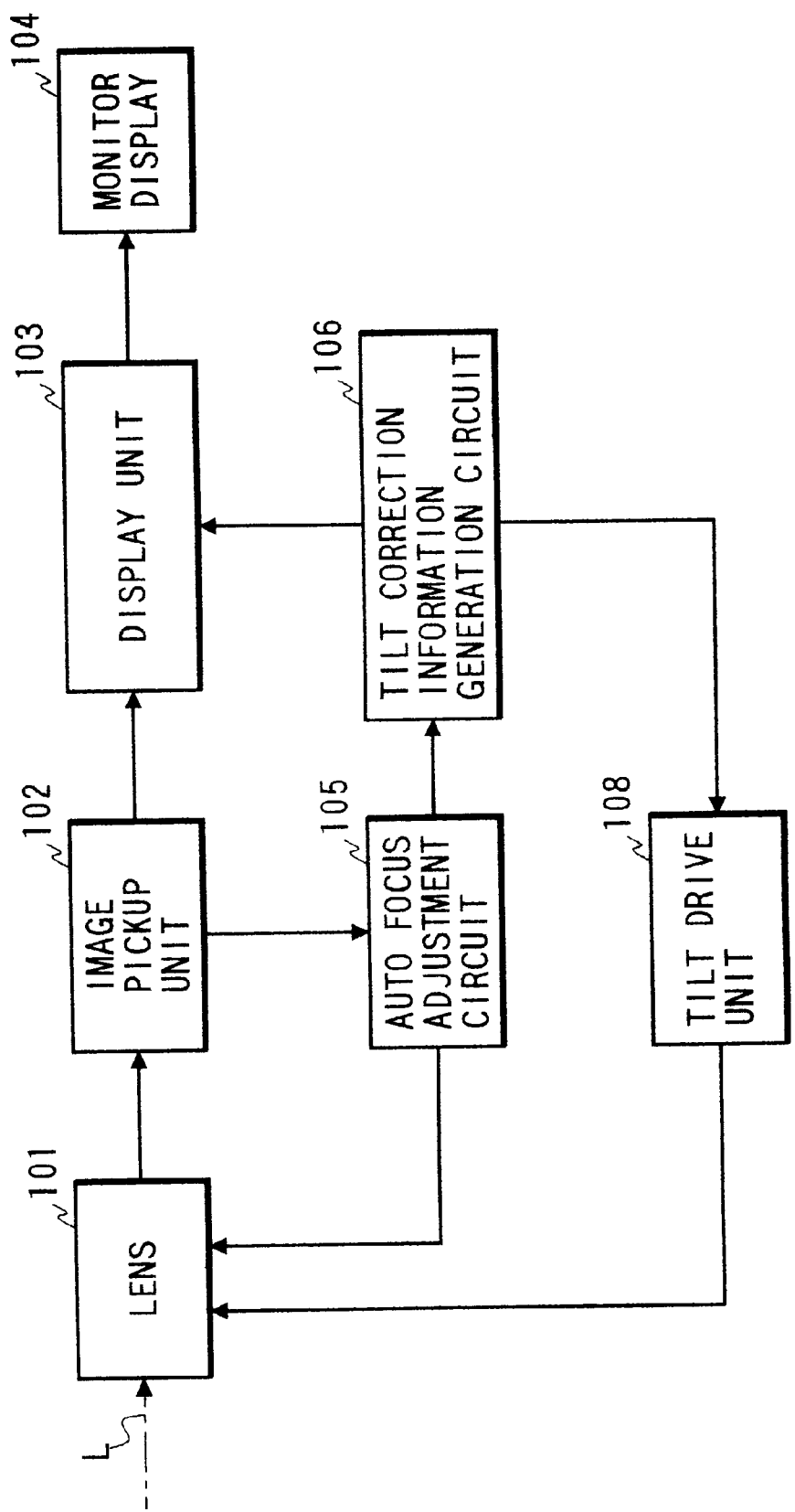

ELECTRONIC CAMERA HAVING A TILT DETECTION FUNCTION

BACKGROUND OF THE INVENTION

1. Field of the Invention

The present invention relates to an electronic camera and, more particularly, to a high-image quality electronic camera which allows character recognition and the like.

2. Related Background Art

Conventionally, in order to input characters written on an original or the like into a computer, for example, an image scanner using a linear photoelectric conversion element is used for inputting the character images.

In this case, in the input operation, the original written with the characters is horizontally held by being pressed against the surface of a transparent member such as a glass plate.

Image signals obtained in this manner are subjected to character recognition processing using a hardware arrangement such as a computer having a character recognition processing function or a software program having a character recognition processing function.

Also, a method in which a video signal obtained from a camera is input to the above-mentioned computer having the character recognition processing function and is subjected to character recognition processing has been proposed.

When the character recognition processing is performed based on a video signal obtained from the camera, as described above, if an object to be photographed is not parallel to an image pickup surface, an in-focus state cannot be attained on the entire area of the object to be photographed.

In order to solve such a problem, a method of adjusting an optical system using a tilt mechanism such as a tilt & shift mechanism to attain an in-focus state on the entire area of the object to be photographed even if the object to be photographed is not parallel to the image pickup surface has been proposed.

However, when an object to be photographed written with characters is to be photographed using a camera, it is difficult to attain an in-focus state on the entire surface of the object to be photographed. For this reason, the photographing operation is performed using a base, stand or the like for fixing the object to be parallel to the image pickup surface. This method is inconvenient since it requires a cumbersome operation of setting the base or stand for fixing the object and the camera, and it renders the photographing apparatus bulky.

With the above-mentioned method, an object to be subjected to the photographing operation for performing character recognition is limited to one that can be placed under the base, such as a paper sheet. Therefore, it is difficult to photograph an image of a signboard such as a directional sign, road sign, or the like, a large object or an immovable object such as a plate attached to an industrial product, or a three-dimensional object.

As described above, an in-focus state can be attained on the entire object or an image distortion can be eliminated using an optical system having a tilt mechanism such as a tilt & shift mechanism even when the image pickup surface is not perpendicular to the object. However, the tilt mechanism cannot be easily operated since it requires skills in adjustment.

An electronic camera which automates adjustment requiring skills has also been proposed. However, such a camera has a high cost since it requires a complicated mechanism and a complicated control.

SUMMARY OF THE INVENTION

The present invention has been made in consideration of the above situation, and has as its first object to provide an electronic camera which can realize a high-image quality photographing operation.

It is the second object of the present invention to provide an inexpensive electronic camera which can easily attain character recognition.

It is the third object of the present invention to provide an electronic camera which can realize accurate focus adjustment on the entire image pickup surface.

In order to achieve the above objects, according to a preferred embodiment of the present invention, there is disclosed an electronic camera comprising image pickup means for converting an object image formed on an image pickup surface into an electrical signal, focusing means for forming the object image on the image pickup surface, focus detection means for dividing the object image formed on the image pickup surface into a plurality of portions, and performing focus detection for the plurality of portions, focus adjustment means for adjusting the position of the focusing means on the basis of outputs from the focus detection means, and display means for displaying focus detection information of the plurality of portions detected by the focus detection means.

According to a preferred embodiment of the present invention, there is disclosed an electronic camera which further comprises tilt correction information generation means for generating tilt correction information used for setting the image pickup surface of the camera to be parallel to a planar object on the basis of results obtained by the divisional distance measurement operations of the focus detection means, and displays the tilt correction information on the display surface of the display means.

According to a preferred embodiment of the present invention, distance measurement information at each of a large number of points obtained by the divisional distance measurement operations of the focus detection means can be displayed in a finder. With this information, a user can confirm, during a photographing operation, whether or not an in-focus state is attained on the entire object with respect to the image pickup surface. Thus, a photographing failure when an in-focus state is not attained on the entire object can be prevented.

It is still another object of the present invention to provide an electronic camera which can notify a photographer of the current tilt direction of the camera during a photographing operation so as to allow the photographer to perform easy tilt adjustment, and can easily set an in-focus state on the entire object.

Other objects and features of the present invention will become apparent from the following specification and the accompanying drawings.

BRIEF DESCRIPTION OF THE DRAWINGS

FIG. 2 which is composed of FIGS. 2A and 2B is a block diagram showing the arrangement of an electronic camera according to an embodiment of the present invention;

FIG. 10 is a block diagram showing another embodiment of the present invention.

DETAILED DESCRIPTION OF THE PREFERRED EMBODIMENTS

An embodiment of an electronic camera according to the present invention will be described below with reference to the accompanying drawings.

Figure 1:
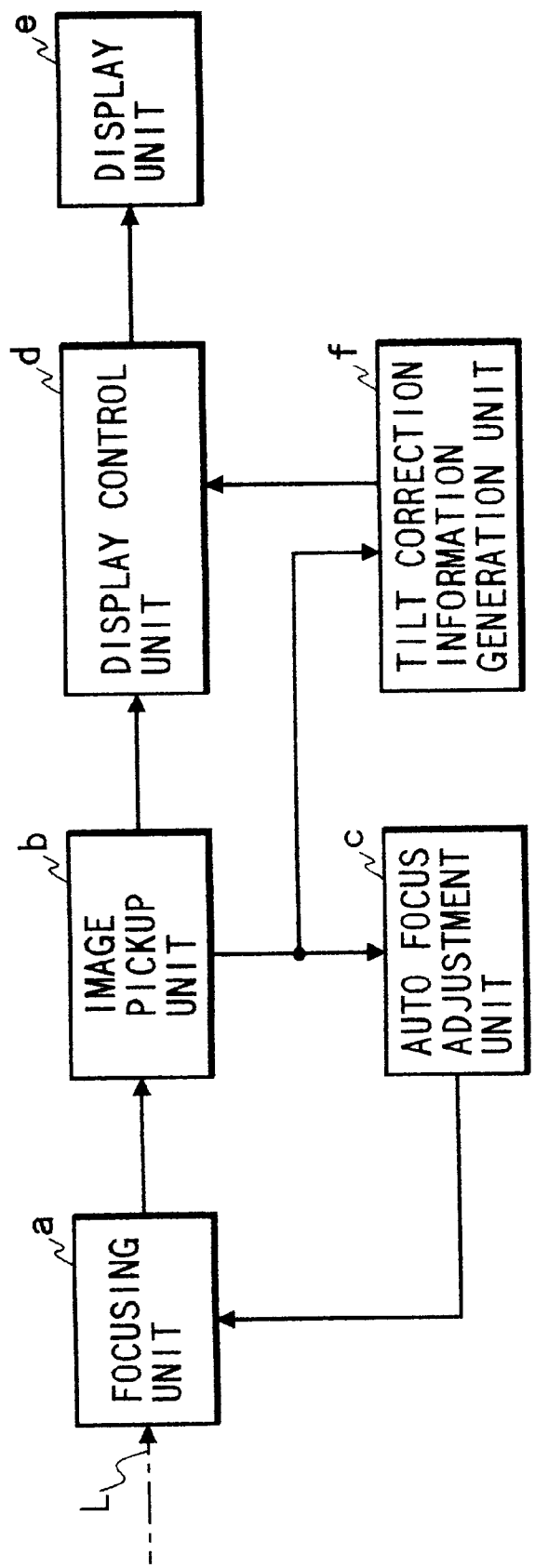
FIG. 1 is a block diagram showing the functional arrangement of an electronic camera according to the present invention.

FIG. 1 is a block diagram showing the principal functions of the electronic camera of this embodiment. As shown in FIG. 1, the electronic camera of this embodiment comprises a focusing unit a, an image pickup unit b, an auto focus adjustment unit c, a display control unit d, a display unit e, and a tilt correction information generation unit f.

The image pickup unit b has an image pickup element (see FIGS. 2A and 2B) for converting light L reflected by an object into an electrical signal, and outputting the electrical signal. The image pickup element is disposed on an image pickup surface on which the light L reflected by the object is focused.

The focusing unit a focuses the light L reflected by the object on the image pickup surface of the image pickup element arranged in the image pickup unit b, and is constituted by various optical lenses.

The auto focus adjustment unit c drives the focusing unit a, and performs adjustment to attain an in-focus state of an object image formed on the image pickup surface of the image pickup element of the image pickup unit b. In this embodiment, a portion of the object image formed on the image pickup surface is subjected to divisional distance measurement operations.

The display control unit d displays a plurality of pieces of distance measurement information obtained by the divisional distance measurement operations of the auto focus adjustment unit c on the display surface of the display unit e.

The tilt correction information generation unit f generates tilt correction information for setting the image pickup surface of the camera to be parallel to a planar object on the basis of the divisional distance measurement results from the image pickup unit b, and displays the information on the display surface of the display unit e.

The arrangement of the electronic camera of this embodiment will be described in detail below with reference to the block diagram in FIGS. 2A and 2B.

Referring to FIGS. 2A and 2B, a digital electronic camera 100 uses a memory card 801 as its recording medium.

The digital electronic camera 100 comprises a photographing lens 1, a shutter 2 also used as an iris, which shutter has both iris and shutter functions, an electronic flash 3, an electronic viewfinder (EVF) 4 used for monitoring an image to be photographed and for displaying various kinds of information for helping operations, and the states of the camera, and an operation unit 5 consisting of various switches used for externally controlling the digital electronic camera 100 of this embodiment.

The camera 100 also comprises an image pickup element 6 for converting an object image, which is obtained by focusing light reflected by an object by the photographing lens 1, into an electrical signal, and a timing signal generation circuit (TG) 7 for generating a timing signal required for operating the image pickup element.

The camera 100 further comprises an image pickup element drive circuit 8 for amplifying a signal from the timing signal generation circuit to a level high enough to drive the image pickup element and generating various drive pulses, and a preprocessing circuit 9 including a CDS (correlation double sampling) circuit for removing noise output from the image pickup element 6 and a nonlinear amplifier circuit required before A/D conversion.

Figure 7:
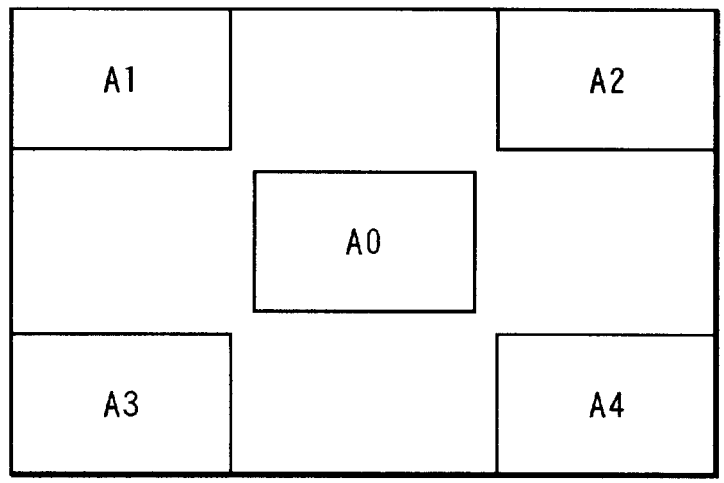
FIG. 7 is a view showing distance measurement areas on an image pickup surface.

Moreover, the camera 100 comprises an A/D converter 10 and a focus detection circuit 11. The focus detection circuit 11 of this embodiment has five distance measurement areas A0, A1, A2, A3, and A4 shown in FIG. 7 in its image pickup surface, detects the sharpness of an image in each area on the basis of the rise state of the edge, i.e., sharpness, of an image pickup signal, and generates a focus evaluation value of each area by signal processing of the sharpness.

In addition, the camera 100 comprises a buffer memory 12 and a microprocessor 13. The microprocessor 13 is arranged for controlling the respective signal processing units, the mechanical portion of the camera, and the operation unit. The camera 100 further comprises an EVF drive circuit 14, a motor 15 as a focus lens drive unit, a drive unit 16 of the shutter also used as an iris, and an electronic flash circuit 17.

The camera 100 also comprises a memory controller 802 for controlling the buffer memory 12 for temporarily storing a picked-up image, a digital signal processing circuit 803 for converting the output from the image pickup element 6 into a recording format suitable for the memory card 801, and a memory card I/F 804 for connecting the digital electronic camera 100 and the memory card 801.

The operation of the electronic camera of this embodiment will be described below based on the above-mentioned arrangement. When a photographer depresses the release button of the operation unit 5 to its half stroke position, the camera starts a photographing preparation operation. With this operation, light reflected by an object becomes incident on the image pickup element 6 via the photographing lens 1 and the shutter 2 also used as an iris, and forms an object image on the image pickup surface of the image pickup element 6.

At this time, the shutter 2 also used as an iris performs an iris operation under the control of the drive unit 16 of the shutter also used as an iris, and serves as an iris for controlling the amount of light incident on the image pickup element 6.

The image pickup element 6 is operated by a drive signal generated by the image pickup element drive circuit 8 on the basis of the output from the timing signal generation circuit 7. Note that the operation of the timing signal generation circuit 7 is controlled by the microprocessor 13.

The output from the image pickup element 6 driven as described above is input to the preprocessing circuit 9 arranged at the output side of the element 6.

The preprocessing circuit 9 performs CDS processing for removing low-frequency noise included in the output from the image pickup element 6, and processing for nonlinearly converting the image pickup output so as to effectively use the dynamic range of the A/D converter 10.

The brightness of the object is measured based on the output from the image pickup element 6, and the microprocessor 13 calculates the iris value and shutter speed, for main exposure, of the shutter 2 also used as an iris. During the photographing preparation operation, the iris diameter of the drive unit 16 of the shutter also used as an iris is feedback-controlled to the microprocessor 13 so as to perform an auto focus adjustment operation.

If it is determined that the brightness is insufficient, the electronic flash circuit 17 starts a charging operation for preparing for light emission.

Furthermore, the focus detection circuit 11, the microprocessor 13, and the focus lens drive unit (motor) 15 perform so-called hill-climb type auto focus adjustment for driving the focus lens to maximize the focus evaluation value on the basis of the image pickup signal preprocessed by the preprocessing circuit 9.

The same image pickup signal is supplied to the EVF 4 via the EVF drive circuit 14, and is displayed on the EVF 4. Thus, the photographer can monitor the object image.

Simultaneously with the monitoring operation of the object image, photographing conditions calculated by the microprocessor 13 and tilt information (to be described later) are supplied to the EVF 4 via the EVF drive circuit 14 and are displayed on the EVF 4. With these pieces of information, the photographer can know the photographing state of the camera.

When the photographer depresses the release button of the operation unit 5 to its full stroke position, the electronic camera starts a photographing operation. In this case, the iris diameter of the shutter 2 also used as an iris is controlled by the drive unit 16 of the shutter also used as an iris to a size based on the calculated control value. With this control, the amount of light incident on the image pickup element 6 is appropriately limited.

In particular, when the image pickup element 6 comprises an interlace read type CCD, incident light after the photographing operation can be prevented from adversely influencing the signal charge during charge transfer, by closing the shutter.

Depending on the output from a photometry circuit, the photographing operation is performed by controlling the electronic flash 3 to emit light by the electronic flash circuit 17.

In this manner, the preprocessed image pickup signal output obtained by the main exposure is supplied to the A/D converter 10, and is converted into a digital signal. The digital signal is input to the memory controller 802. The memory controller 802 temporarily stores the digital image pickup signal in the buffer memory 12 under the control of the microprocessor, and then reads out the stored signal in a predetermined order determined by, e.g., the pixel layout of color filters of the image pickup element 6.

The readout digital signal is converted into a signal in a predetermined format by the digital signal processing circuit 803, and the converted signal is recorded on the memory card 801 via the memory card I/F 804.

Generation of tilt information and the auto focus adjustment operation in the electronic camera of this embodiment will be described below.

Figure 3A:
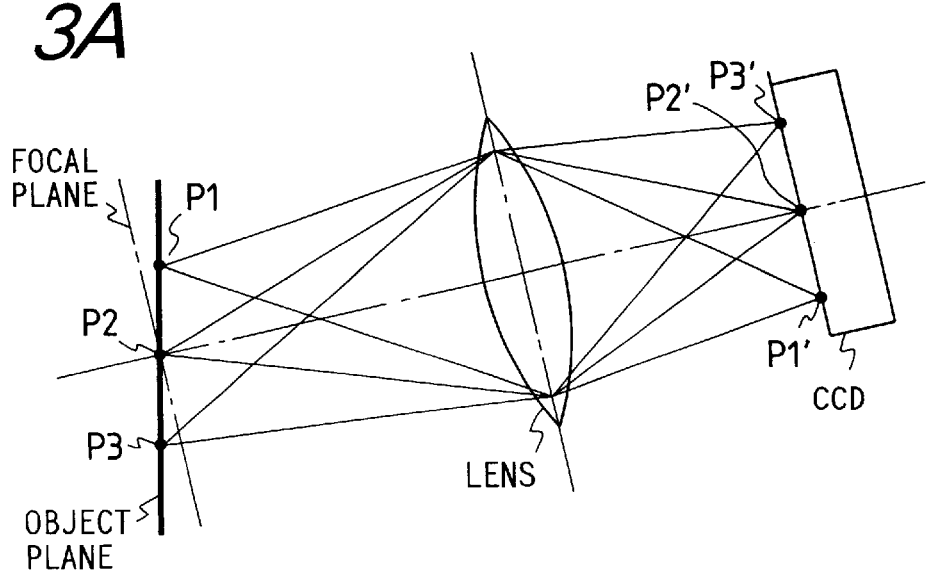
FIGS. 3A and 3B are optical path diagrams of the electronic camera in the embodiment shown in FIGS. 2A and 2B.
Figure 3B:
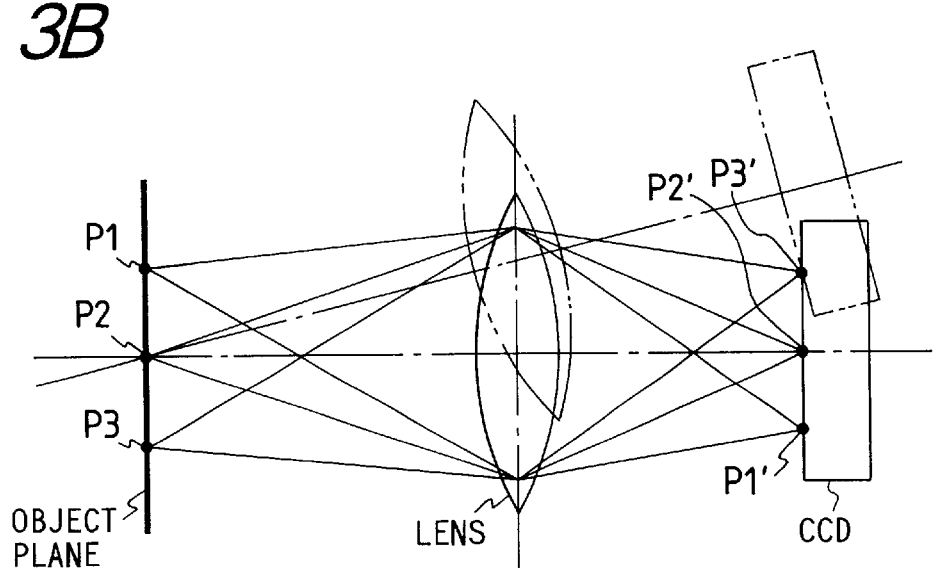

FIGS. 3A and 3B are optical path diagrams showing the positional relationship among the object, the lens, and the image pickup element 6 (CCD), and the optical path.

As shown in FIG. 3A, when the image pickup surface is tilted relative to the object, the focusing state changes depending on the position of a picked-up image. More specifically, points P1, P2, and P3 on the object will be examined below. In the case of FIG. 3A, the point P2 on the optical axis is an in-focus point, the point P1 above the optical axis in FIG. 3A is a point on the front focus side of the focal plane, and the point P3 is a point on the rear focus side of the focal plane.

Figure 8:
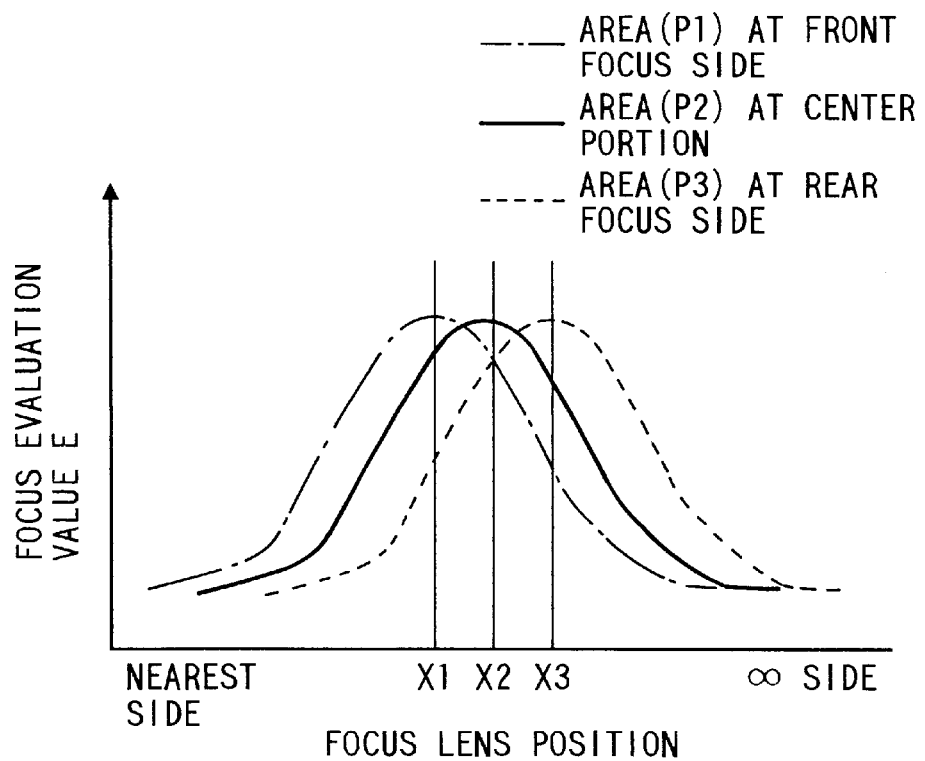
FIG. 8 is a graph showing a change in focus evaluation value depending on the position of a focus lens in units of distance measurement areas.

At this time, when the above-mentioned hill-climb type auto focus adjustment based on sharpness evaluation of the image is performed by driving the focus lens, the locus of the sharpness evaluation value has a waveform, as shown in FIG. 8.

Referring to FIG. 8, a solid curve represents the locus of the focus evaluation value on the central distance measurement area near the point P2 on the focal plane. On the other hand, an alternate long and short dashed curve represents the locus of the focus evaluation value on an area where the point P1 on the front focus side of the focal plane is present, and a broken curve represents the locus of the focus evaluation value on an area where the point P3 on the rear focus side of the focal plane is present.

Therefore, in order to attain an in-focus state of the entire object, the focal plane parallel to the lens and the image pickup surface of the electronic camera need only overlap the object surface. For this purpose, focus lens positions X1, X2, and X3 corresponding to the vertices of the three loci can be set to be equal to each other.

As shown in FIG. 3B, the electronic camera main body including the lens and the CCD can be tilted so that a portion, where the point P1 on the object is present, above the optical axis, i.e., a portion of the area in the front focus state is moved toward the nearest side, and a portion, where the point P3 on the object, below the optical axis, i.e., a portion of the area in the rear focus state is moved toward the infinity side. If the position of the electronic camera is not moved, framing must be performed again since objects in other directions may be photographed.

Figure 4A:
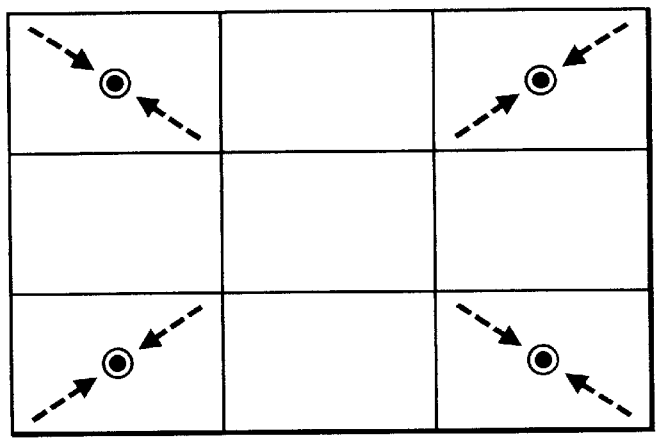
FIG. 4A is a view showing all the display marks in a finder in the embodiment shown in FIGS. 2A and 2B.

FIG. 4A shows an example of all the display marks in the finder. As shown in FIG. 4A, arrows and dots can be displayed at positions corresponding to the respective distance measurement areas A1 to A4 shown in FIG. 7, and in an in-focus state, only a dot is turned on.

Figure 4B:
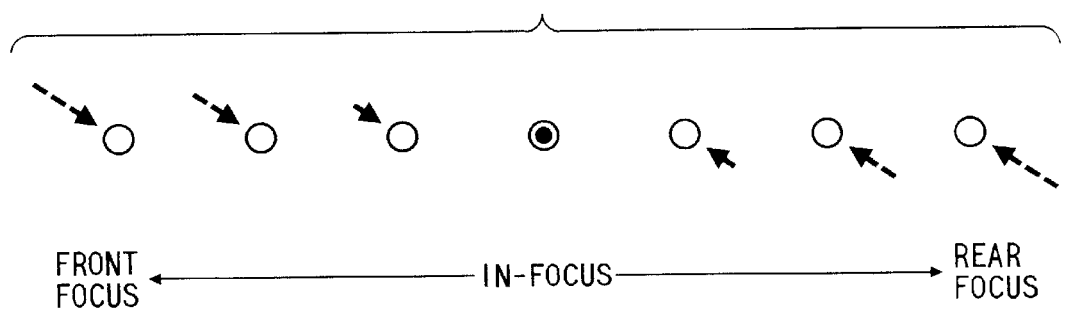
FIG. 4B is a view showing an example of a turn-on method of the display marks, whose patterns change depending on the focusing state, in the finder in the embodiment shown in FIGS. 2A and 2B.

In this embodiment, the length of each arrow is divided into three steps. The fourth distance measurement area A4 located at the lower right position will be taken as an example. As shown in FIG. 4B, in a front focus state, a black arrow pointing in the lower right direction is turned on. In a rear focus state, a lighter arrow pointing in the upper left direction is turned on. The length of the arrow can express the degree of an out-of-focus state in three steps.

The displayed contents are determined based on the deviation amounts between peak focus lens positions Xa1 to Xa4 and the stop position. Note that the number of divisions of the length of the arrow is not limited to three. For example, a different number of divisions of the length of the arrow may be used or the length of the arrow may be continuously changed.

Figure 5:
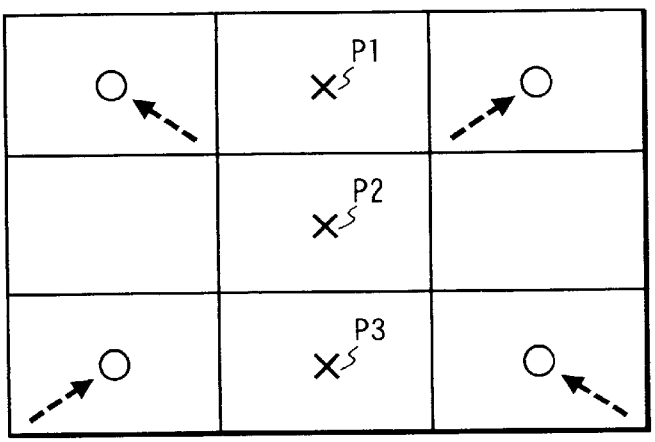
FIG. 5 is a view showing an example of the turn-on method of the display marks in the finder in the embodiment shown in FIGS. 2A and 2B.

FIG. 5 shows the display state corresponding to the state shown in FIG. 3A. In FIG. 3A, since the lens and the image pickup surface of the CCD are not tilted relative to the object surface in a direction perpendicular to the plane of the drawing of FIG. 3A, two positions, i.e., the upper left position (first distance measurement area A1) in the direction of the point P1 and the upper right position (second distance measurement area A2) indicate the front focus state.

On the other hand, two positions, i.e., the lower left position (third distance measurement area A3) in the direction of the point P3 and the lower right position (fourth distance measurement area A4) indicate the rear focus state. For this reason, as shown in FIG. 5, black arrows are turned on at the upper right and left positions and lighter arrows are turned on at the lower right and left positions.

Note that framing can be corrected by moving the camera so that the object roughly moves in a direction as the sum of the vectors of the arrows.

Figure 6A:
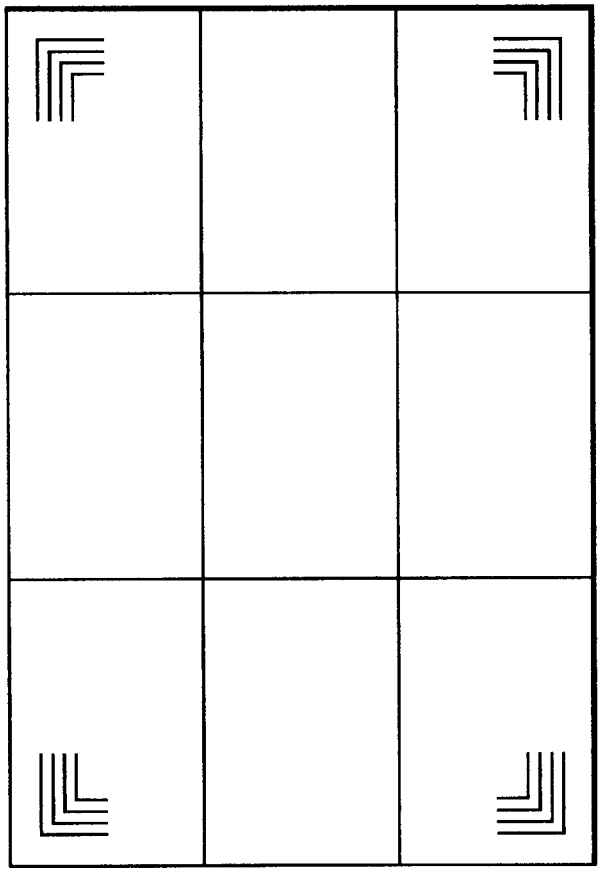
FIG. 6A is a view showing another example of all the display marks in the finder in the embodiment shown in FIGS. 2A and 2B.
Figure 6B:
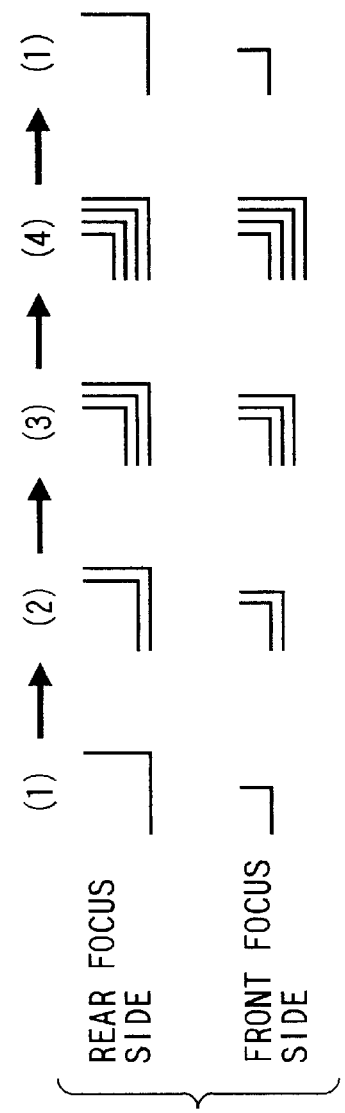
FIG. 6B is a view showing another example of the turn-on method of the display marks, whose patterns change depending on the focusing state, in the finder in the embodiment shown in FIGS. 2A and 2B.

As for the display method, as shown in FIGS. 6A and 6B, some key-shaped line marks may be displayed on the areas of the four corners, and display patterns (1) to (4) may be repetitively displayed, as shown in FIG. 6B. In this case, the degree of an out-of-focus state can be expressed by changing the repetition speed of the display patterns in correspondence with the degree of the out-of-focus state.

Figure 9:
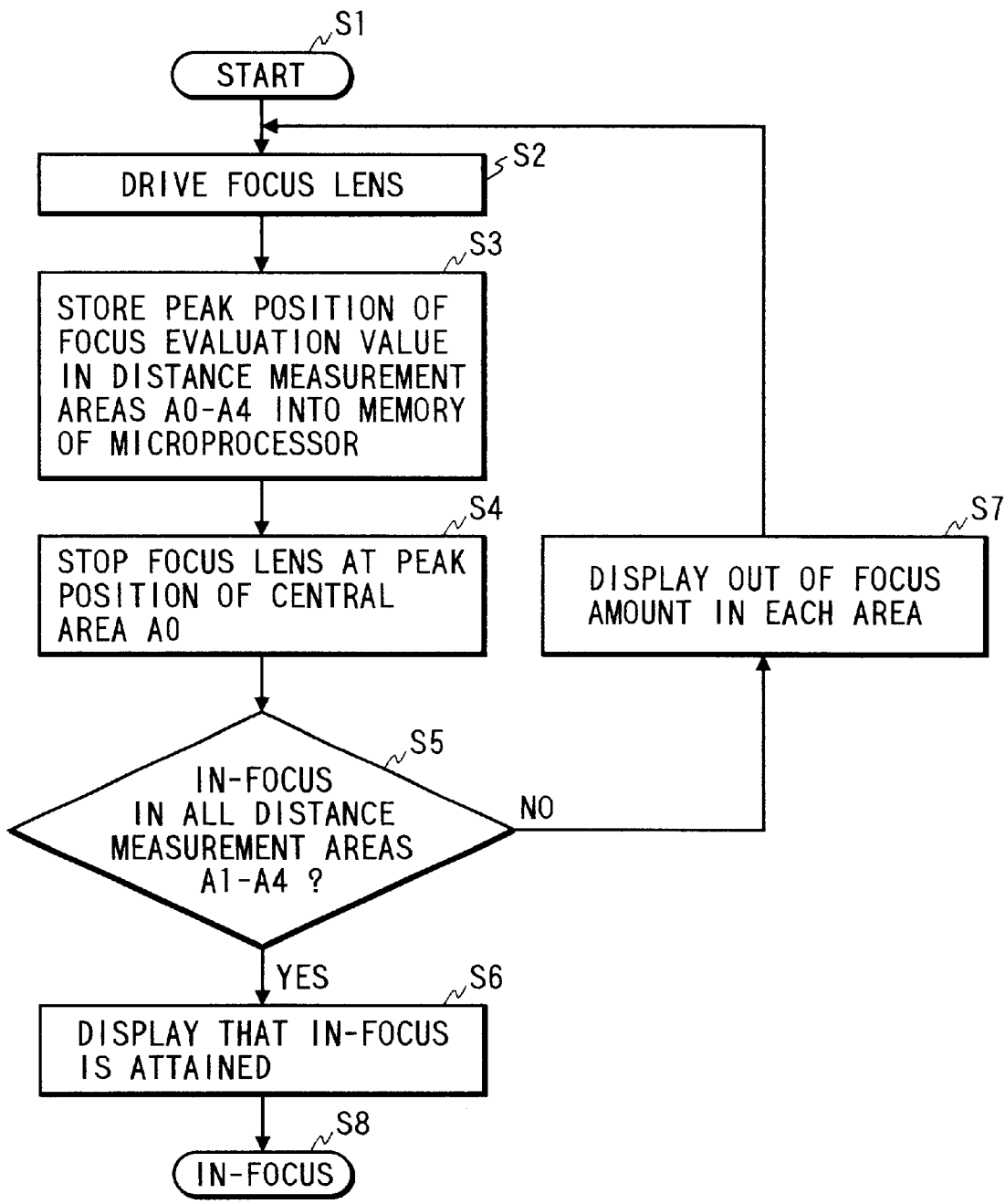
FIG. 9 is a flow chart showing the processing sequence of auto focus adjustment (AF) and finder display operations.

The above-mentioned operation will be described below with reference to the flow chart in FIG. 9.

Step S1: When the release button is depressed to its half stroke position, auto focus adjustment (AF) is started.

Step S2: The focus lens drive unit 15 moves the focal point of the photographing lens, and the focus evaluation value on the central distance measurement area A0, which value is generated by the focus detection circuit 11, is monitored, thus attaining hill-climb type focus adjustment.

Step S3: At this time, the focus detection circuit 11 also generates the focus evaluation values on the first to fourth distance measurement areas A1 to A4, monitors these values, and stores peak values Ea1 to Ea4 on the distance measurement areas A1 to A4 and corresponding focus lens positions Xa1 to Xa4.

Step S4: The focus lens is stopped at the in-focus position on the distance measurement area A0.

Step S5: It is checked if all the distance measurement areas A1 to A4 are in an in-focus state. This decision step is attained by comparing the stop position of the focus lens with the peak positions Xa1 to Xa4 of the respective areas by the microprocessor 13. More specifically, if the comparison result indicates an identical position, it is determined that the area of interest is in an in-focus state; otherwise, it is checked if the in-focus position is present on the front or rear focus side, and the defocus amount of each distance measurement area is determined by the difference between the two positions.

Alternatively, the focus evaluation values on the distance measurement areas A1 to A4 upon stopping the focus lens are compared with the stored peak values Ea1 to Ea4 of these areas, and if the difference between the two values for each area is equal to or smaller than a predetermined threshold value, it is determined that the focus evaluation value of the area of interest falls within the object depth. Thus, in this case, it may be determined that the area of interest is in an in-focus state.

The microprocessor 13 determines the display contents based on the comparison results, and supplies a display instruction signal to the EVF drive circuit 14.

If all the distance measurement areas A1 to A4 are in an in-focus state, the flow advances to step S6; otherwise, the flow advances to step S8.

Step S6: A message indicating that an in-focus state is attained is displayed, and thereafter, the flow advances to step S8 to set a standby state in which the camera waits for a main exposure operation.

Step S7: The out-of-focus amounts and directions of the respective areas are displayed on the EVF 4. The photographer changes the direction of the electronic camera in accordance with the displayed information, thus performing framing again. Thereafter, the flow returns to step S2, and the-above-mentioned processing is repeated until the message indicating that an in-focus state is attained is displayed in step S6.

In this embodiment, the divisional distance measurement AF is performed using five areas. However, since three points can designate one plane, the number of divisions can be at least three.

When five areas are used, the distance measurement can be performed at four corners and the central portion, and distance measurement information can be displayed at the four corners. For this reason, the photographer can easily understand the tilt correction direction independently of the tilt direction of the camera, i.e., vertical, horizontal, and oblique directions.

As described above, since the electronic camera of this embodiment generates information indicating whether or not the central portion and peripheral portions are present at an equal distance from an object on the basis of distance measurement information obtained at a large number of points by the divisional distance measurement operations of an object image, and displays the generated information on the display unit, a photographer can accurately perform a photographing operation of, e.g., an original while holding the camera with his or her hands, without fixing the camera using a stand or base, and a photographing failure when the entire object image is not in an in-focus state can be prevented. In addition, since the above-mentioned photographing operation can be performed without arranging any tilt mechanism, the arrangement of the electronic camera which can obtain photographing data that allows easy character recognition can be simplified, thus reducing the manufacturing cost.

Since the tilt correction information for correcting the tilt state of the camera is displayed on the display surface of the display unit, the photographer can easily understand the tilt correction direction, and tilt adjustment can be attained even at an image quality as low as that of the EVF.

FIG. 10 shows another embodiment of the present invention. In the above-mentioned embodiment, the tilt state of the camera is displayed by displaying focusing states on respective portions of the image pickup surface on the monitor display. However, in this embodiment, the tilt state is automatically adjusted.

Referring to FIG. 10, a photographing lens 101 allows focus adjustment and tilt adjustment. An object image formed via the photographing lens 101 is photoelectrically converted into an image pickup signal by an image pickup element in an image pickup unit 102, and is subjected to predetermined camera signal processing. Thereafter, the processed signal is output, and is displayed on a monitor display 104 via a display control unit 103.

On the other hand, the image pickup signal output from the image pickup element of the image pickup unit 102 is also supplied to an auto focus adjustment circuit 105, and focus evaluation values such as edge components of an image are extracted on a plurality of areas in the image pickup surface, as described above, thus performing focus detection.

With this operation, the focusing states on the respective areas in the image pickup surface are discriminated. The auto focus adjustment circuit detects a change in focusing state of each area by reciprocally displacing the lens by a predetermined small distance along the optical axis, thus detecting the in-focus, front focus, and rear focus areas.

The detection result is supplied to a tilt correction information generation circuit 106, and the tilt state of the lens relative to an object (e.g., an original) is discriminated on the basis of the front focus information, in-focus information, and rear focus information of the respective areas. The tilt state information is supplied to the display control unit 103, and is displayed on the monitor display 104 such as an electronic viewfinder together with an image as in the above-mentioned embodiment.

The tilt correction information generated by the tilt correction information generation circuit 106 is supplied to a tilt drive circuit 108. The circuit 108 drives a tilt adjustment motor of the lens 101 to correct the tilt state of the lens 101.

With this operation, the tilt state of the lens 101 relative to the object is detected and displayed, and the tilt state of the lens can be corrected by automatic adjustment.

According to this embodiment, a photographing failure of, e.g., an original image when an out-of-focus state locally occurs due to a tilt state of the lens relative to the original can be prevented.

What is claimed is:

1. An electronic camera comprising:
   a photographing lens;
   image pickup means for photoelectrically converting an object image formed on an image pickup plane by said photographing lens;
   focus detection means for dividing the image pickup plane into a plurality of non-overlapping areas, and detecting a focusing state of each of the respective areas; and
   display means for simultaneously displaying on a monitor a change of an out-of-focus direction of each of the plurality of non-overlapping areas in accordance with a detection result of said focus detection means, respectively.

2. A camera according to claim 1, further comprising:
   tilt correction information generation means for generating tilt correction information used for setting the image pickup plane of the camera to be parallel to a planar object on the basis of information of the detected focusing states of the respective areas.

3. A camera according to claim 1, wherein the plurality of areas include a central portion of the image pickup plane and a plurality of areas around the central portion.

4. A camera according to claim 1, wherein said display means comprises an electronic viewfinder.

5. An electronic camera comprising:
   a photographing lens;
   image pickup means for photoelectrically converting an object image formed on an image pickup plane by said photographing lens;
   focus detection means for dividing the image pickup plane into a plurality of areas, and detecting focusing states on the respective areas;
   tilt detection means for detecting a tilt of said photographing lens on the basis of information of the focusing states of the respective areas detected by said focus detection means; and
   tilt correction means for correcting the tilt of said photographing lens on the basis of an output from said tilt detection means.

6. A camera according to claim 5, wherein said tilt correction means comprises tilt correction information generation means for generating tilt correction information used for setting the image pickup plane of the camera to be parallel to a planar object, and correcting the tilt of said photographing lens on the basis of the tilt correction information.

7. A camera according to claim 5, wherein the plurality of areas include a central portion of the image pickup plane and a plurality of areas around the central portion.

8. A camera according to claim 5, wherein said display means comprises an electronic viewfinder.

9. A camera according to claim 5, further comprising auto focus adjustment means for performing focus adjustment of said photographing lens on the basis of an output from said focus detection means.

10. An electronic camera comprising:
    an optical system;
    image pickup means for photoelectrically converting an object image formed on an image pickup plane by said optical system;
    detection means for dividing the image pickup plane into a plurality of non-overlapping areas, and detecting an image sensing state of each of the respective areas; and
    display means for simultaneously displaying on a monitor a change of an out-of-focus direction of each of the plurality of non-overlapping areas in accordance with a detection result of said detection means, respectively.

11. A camera according to claim 10, further comprising:
    tilt correction information generation means for generating tilt correction information used for setting the image pickup plane of the camera to be parallel with a planar object on the basis of information of the detected focusing states of the respective areas.

12. A camera according to claim 10, wherein the plurality of areas include a central portion of the image pickup plane and a plurality of areas around the central portion.

13. An electronic camera comprising:
    a photographing lens;
    image pickup means for photoelectrically converting an object image formed on an image pickup plane by said photographing lens;
    focus detection means for dividing the image pickup plane into a plurality of areas, and detecting focusing states on the respective areas;
    display means for displaying the focusing states on the plurality of areas detected by said focus detection means; and
    tilt correction information generation means for generating tilt correction information used for setting the image pickup surface of the camera to be parallel to a planar object on the basis of information of the detected focusing states of the respective areas.

14. A camera according to claim 13, wherein the plurality of areas include a central portion of the image pickup plane and a plurality of areas around the central portion.

15. A camera according to claim 13, wherein said display means comprises an electronic viewfinder.

16. An apparatus comprising:

a focus stated detection device that detects a focus state of each of a plurality of detection areas of an imaging surface of an image pickup device on which an image forming optical system forms an image; and a display device that displays a change direction of an out-of-focus state in each of the plurality of detection areas in accordance with a detection result of said focus state detection device.

17. Apparatus according to claim 16, wherein said apparatus includes a camera.

18. Apparatus according to claim 16, wherein said apparatus includes an electronic image pickup camera.

19. Apparatus according to claim 16, wherein said apparatus includes a focusing device.

20. An apparatus comprising:

a focus state detection device that detects a focus state of each of a plurality of detection areas of an imaging surface of an image pickup device on which an image forming optical system forms an image; and an information forming device that forms tilt correction information of an optical axis of said image forming optical system in accordance with a detection result of said focus state detection device.

21. Apparatus according to claim 20, further comprising a display device that performs a display corresponding to the tilt correction information formed by said information forming device.

22. Apparatus according to claim 21, further comprising:

a driving device that drives said image forming optical system in accordance with the tilt correction information formed by said information forming device.

23. Apparatus according to claim 20, wherein said apparatus includes a camera.

24. Apparatus according to claim 20, wherein said apparatus includes an electronic image pickup camera.

25. Apparatus according to claim 20, wherein said apparatus includes a focusing device.

* * * * *

UNITED STATES PATENT AND TRADEMARK OFFICE
CERTIFICATE OF CORRECTION

PATENT NO. : 6,359,650 B1
DATED : March 19, 2002
INVENTOR(S) : Taro Murakami

It is certified that error appears in the above-identified patent and that said Letters Patent is hereby corrected as shown below:

<u>Column 11,</u>
Line 2, "stated" should read -- state --.

Signed and Sealed this

Eighteenth Day of June, 2002

*Attest:*

*Attesting Officer*

JAMES E. ROGAN
*Director of the United States Patent and Trademark Office*